Figure 1:
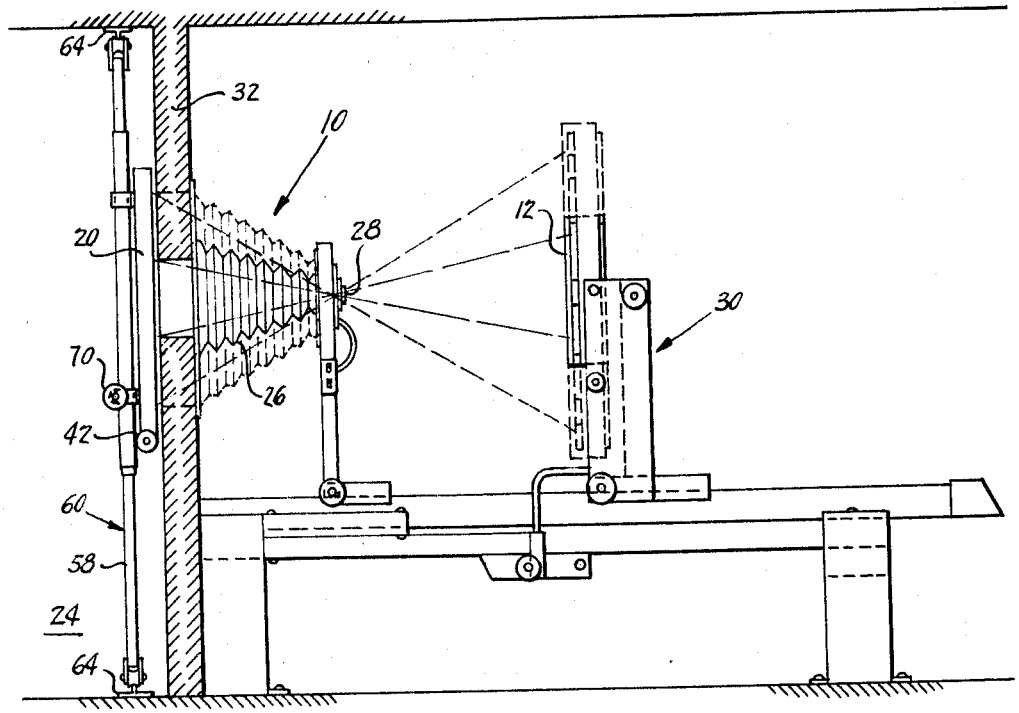

Nov. 22, 1966 R. H. WHITNEY 3,286,586
DARKROOM CAMERA WITH MULTI-EXPOSURE CAMERA BACK
Filed Oct. 23, 1963 2 Sheets-Sheet 1

INVENTOR.
RUSSELL H. WHITNEY
BY Walter S. Pawl
ATTORNEY.

Nov. 22, 1966   R. H. WHITNEY   3,286,586
DARKROOM CAMERA WITH MULTI-EXPOSURE CAMERA BACK
Filed Oct. 23, 1963   2 Sheets-Sheet 2

INVENTOR.
RUSSELL H. WHITNEY
BY Walter S. Paul
ATTORNEY.

United States Patent Office 3,286,586
Patented Nov. 22, 1966

3,286,586
DARKROOM CAMERA WITH MULTI-EXPOSURE CAMERA BACK
Russell H. Whitney, 23 Romar Drive, Annapolis, Md.
Filed Oct. 23, 1963, Ser. No. 318,436
5 Claims. (Cl. 88—24)

This invention relates to novel photographic apparatus with an adjustable multi-exposure photo-composing camera back mounted in a darkroom back of the camera.

The object of the present invention is to facilitate the production of composed multi-page or multi-part forms on large photographic films, by using a darkroom camera for exposing a portion of the film at a time, and adjusting the large film in the darkroom successively to bring corresponding portions of the film in position for properly exposing each of the portions by using the corresponding page or part copies.

Another object is to provide a cheaper way of producing large multi-page composition film exposures directly from the individual page copies, one or more at a time, by using a small camera with a full size multi-page film carrier, adjustable in the image plane in a darkroom, back of the camera, to position the proper page portions of the film for exposure when photographing the corresponding page copies.

A further object is to devise a darkroom camera having a lightproof accordion hood or bellows extending between the camera lens holder and an opening in the wall of the darkroom, a multi-exposure film mounted in the darkroom back of said opening, the film being adjustable in the plane of the image, to the different exposure positions.

A further object is to construct a large multi-exposure film carrier to hold the film in the image plane, and means for adjusting the film for exposure of its several portions, by moving them in said plane successively into the exposure area of a stationary camera.

A further object is to make the above film carrier of transparent material having means for mounting the exposure film on its front side adjacent the rear of the camera casing, and means for mounting a guide line sheet of transparent or ground finish translucent material on the rear side of the film carrier, so that the images may be viewed from the rear of the film carrier without exposing the film, by using a proper filter, during adjustment of the film carrier to properly position the image of the page copy in the copy holder, with respect to the guide lines setting off the exposure areas, and then making the corresponding exposure by removing the filter for the duration of the exposure. The guide lines may be on the back of the film carrier instead of being on a separate sheet attached to the back thereof.

Figure 2:
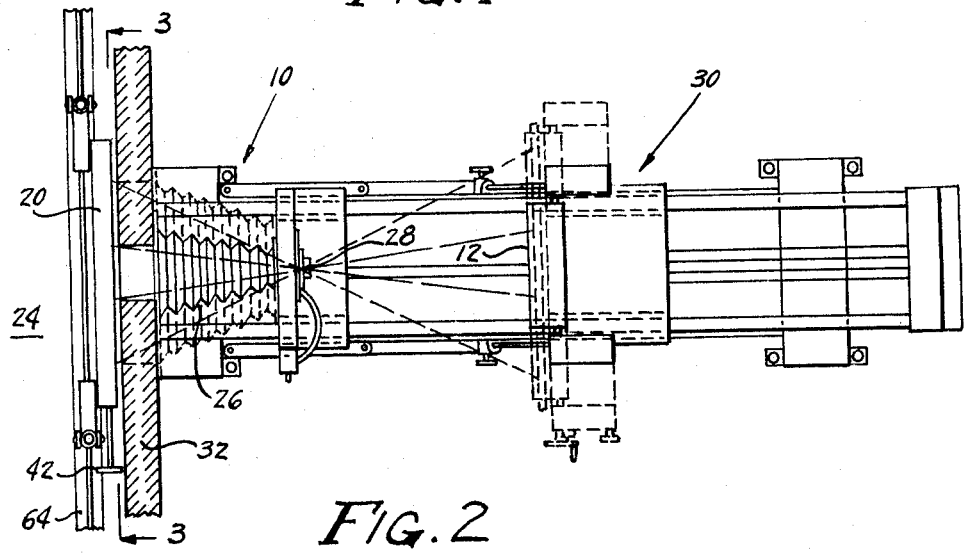
Figures 3, 4:
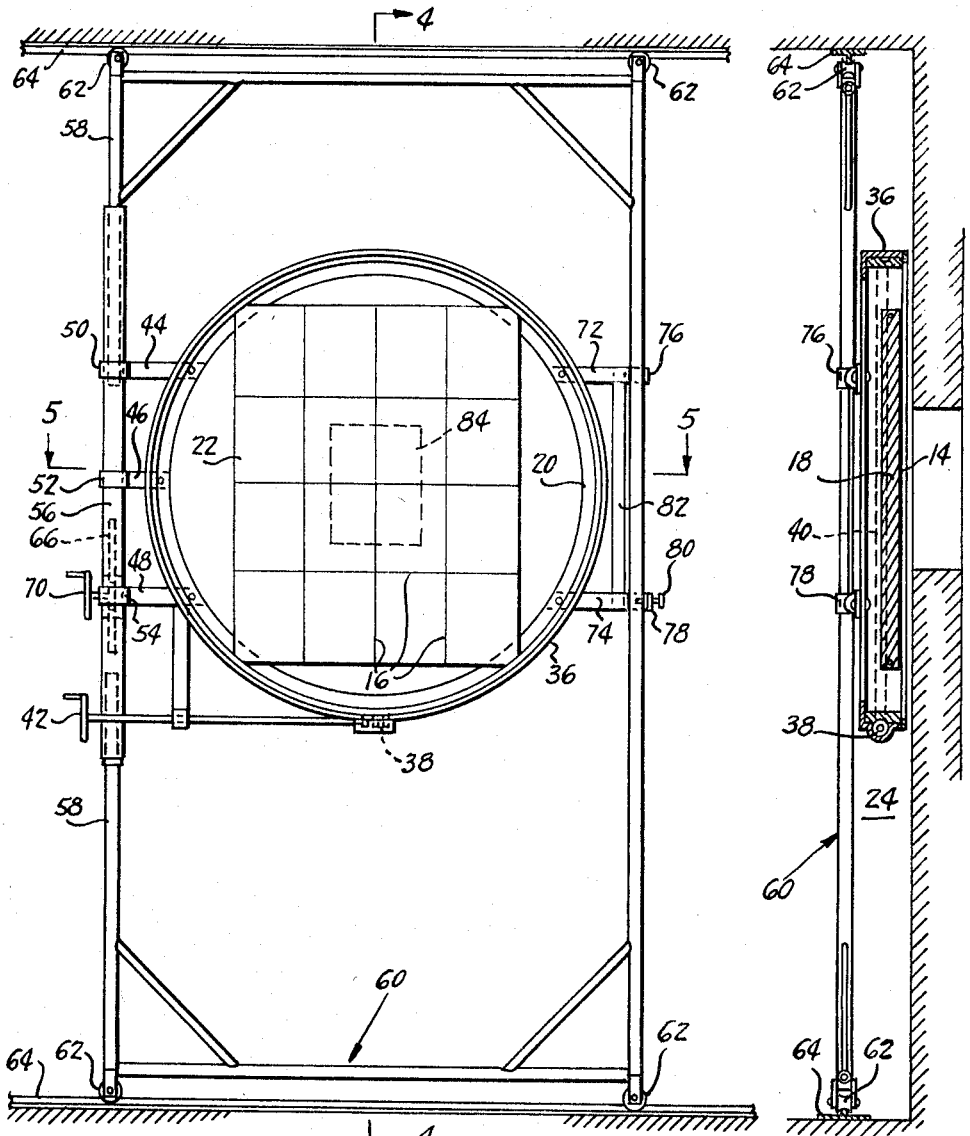
Figure 5:
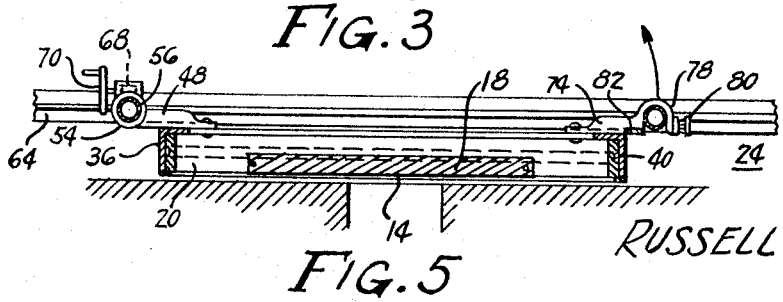

Other and more specific objects will become apparent in the following detailed description of a preferred form of the invention, as illustrated in the accompanying drawings, wherein:

FIG. 1 is a section through a darkroom wall, showing a side view of the apparatus involved in this invention in solid lines, as compared to the large equipment previously required shown in phantom lines, FIG. 2 is a plan view thereof, FIG. 3 is a front elevational view of the film carrier and support frame, FIG. 4 is a vertical sectional view taken on the line 4—4 of FIG. 3, and FIG. 5 is a horizontal sectional view taken on the line 5—5 of FIG. 3.

In the book printing art (offset printing) it has been customary to print a series of pages of a book on both sides of a large sheet, the pages being arranged on the opposite sides of the sheet in such order that, when the sheet is properly folded over midway of its longer dimension, and then refolded midway at right angles thereto, to form eight pages by trimming the edges along the first fold, the pages would be in consecutive order ready for stitching into the book through their second fold; or by making a third additional fold for a sixteen page sheet, a fourth fold for a thirty-two page sheet, etc., the corresponding number of pages would open in consecutive order after their outer folded edges have been trimmed to separate the page sheets.

This has normally been done to save time in handling separate individual page sheets, both in the printing operation as well as in assembly.

The present invention involves the use of a novel darkroom camera arrangement 10 for photographing the page or part copies 12, one at a time, on the sensitized film 14 in proper positions in accordance with guidelines 16 on a layout sheet 18 of clear film mounted on a film carrier 20 of the size of the complete printing plate to be made from the sensitized film after it has been fully exposed and developed. The film carrier or photocomposing camera back 20 consists of a transparent plate 22 like plexiglass, mounted in the darkroom 24 with its front surface in the image plane of the camera, and is adjustable to move to film 14 in said plane in aligning the several page or part exposures, in their proper orientation on the film in accordance with the guide line portions on the layout film 18. The plexiglass or other transparent plate 22 supported in the film carrier 20 may be designed as a suction type film holder, and may have a grained or frosted surface to make the projected camera image more visible.

The carrier ring 20 is mounted on tracks and supports which enable horizontal, vertical and rotational movements. It is in alignment with a conventional, process type, darkroom camera bellows 26, lens 28 and copyboard system 30. The film carrier 20 is located in a darkroom 24, the bellows 26 passing from an opening in a wall to a light-room end, where the lens 28 is located, the copyboard 30 and lighting systems being located in the light-room.

To use the back:

(1) The operator attaches a layout sheet, consisting of appropriate guide lines 16 drawn on a sheet of clear film 18, to the back or darkroom end of the film carrier plate. On the opposite surface of the film carrier plate he places a piece of unexposed film of the size of the complete form or printing plate to be made from it.

(2) He places one or more page or other copies in the copy-holder of the camera and a filter into the filter holder 34, which will prevent temporarily the exposure of the film, and turns-on the copying lights (not shown).

(3) Viewing from the darkroom side, the image of the copy is projected onto the film, through the transparent film holder and transparent layout sheet. By vertical, horizontal and rotational movements of the film carrier and plate, he aligns the projected image in its proper position with respect to the guidelines on the layout sheet.

(4) He removes the filter and makes the exposure. He then repeats the above steps with subsequent pieces of copy until the whole form is exposed.

The complete film is processed, dried and made ready for exposing to the printing plate.

The film carrier or composing camera back is mounted in spaced relation to the darkroom wall in which the camera is mounted and the partial copy holder is adjustably mounted in front of the camera in the lighted gallery. When composing a film negative, a layout sheet of clear film having appropriate guide lines is attached to the back of the film carrier, which may comprise a transparent sheet of rigid material, at least the size of the complete form or printing plate to be made from it, and a piece of unexposed film of the same size is attached to the front of this film carrier. The guide lines are used to facilitate proper positioning of the partial copy images on the composite film.

The page or other partial copies are placed in the copy holder in succession, one copy at a time, the copying lights are turned on and the camera with a suitable filter in its filter holder to prevent exposure, is focussed and the film carrier is adjusted to align the image of each copy in its proper guide line position and orientation of the composure. For this purpose the film carrier is provided with coordinate as well as angular adjustments in the image plane. After each alignment the filter is removed and the page copy is photographed by exposing the corresponding portion of the film. During adjustment, while the filter is used, enough light passes through the filter to project an image that may be viewed at the back of the film carrier to enable proper focussing and positioning of the image without exposing the film.

Proper masking may be provided, if necessary, to prevent exposure outside the guide lines in making an exposure of each portion of the film.

The film carrier plate 22 is supported in the film carrier ring 20 which is rotationally adjustable in the circular frame 36 by means of worm 38 and gear 40, the worm being operated by the worm handwheel 42. The circular frame 36 is provided with horizontal hinge bars 44, 46 and 48, having hinge rings 50, 52 and 54, slidably mounted over tubular hinge 56 which is rotationally mounted on a vertical hinge bearing rod 58. This hinge bearing rod forms one side of a rectangular frame 60 having wheels 62 at its corners for operation on upper and lower tracks 64 for horizontal adjustment to move the film carrier horizontally. Vertical adjustment is obtained by means of the rack 66 on the hinge 56 and the pinion 68 on the hinge ring 54 operated by hand wheel 70. Counterweights may be used for the vertical adjustment to balance the weight of the film carrier assembly.

A pair of horizontal bars 72 and 74 extend from the other side of the circular frame 36 to hook ends 76 and 78 slidably fitting over the other side of the rectangular frame 60 when the film carrier is in normal operating position for adjustment in the image plane. One of the hook ends 78 is provided with a lock pin 80 to keep these hook ends in slidable contact with the rectangular frame. The bars 72 and 74 may be connected by vertical reenforcing bar 82.

In order to mount or remove a film from the film carrier plate 22 the lock pin is pulled out to release the carrier from the corresponding side of the rectangular frame 60 so it may be turned on its hinge away from the darkroom wall 32. After a new film 14 is mounted on the front face of the plate 22, the hinged frame may be moved to operative position for sliding adjustment on the rectangular frame 60. The dotted line area 84 in the middle of the film carrier in FIG. 3 represents the unaligned projection of the camera image.

For reasons of production, most present-day shops are equipped with cameras that can photograph several pages of copy at one time. Such cameras, e.g. one with a 20 x 24 film carrier, a 24" lens system and a 30" x 40" copyboard with appropriate lighting system, would cost in the neighborhood of $6,000.

With the new camera design disclosed here, even a single page size camera may be used to do the same job of producing a high quality multi-page form, bringing the cost down to the $500 to $1,000 range. For these reasons the new camera system can be more economical as well as practical.

Many obvious modifications in the details and forms of the parts may be made without departing from the spirit and scope of the present invention as defined in the appended claims.

What is claimed is:
1. A camera system for making up a composed multi-exposure printing form for reproduction comprising
   a page or other partial copy camera having an open-back mounted in a darkroom wall,
   a multi-exposure size transparent film carrier mounted adjustably in the plane of the image in the darkroom,
   means for adjusting said film carrier in said plane to properly align the film for each of the several exposures, and
   an exposure film mounting means for mounting the film on the front face of said transparent film carrier,
   said front face of said transparent film carrier being frosted and the rear face thereof having guide lines to facilitate viewing of the image during adjustment and to enable proper alignment of the images within the guide lines.

2. A camera having an open-back adapted for mounting on the outside of a darkroom wall opening,
   a multi-exposure film carrier adjustably mounted back of said back opening to align each exposure with said opening,
   means for adjusting said carrier in the plane of said exposures, and
   a filter in said camera to prevent exposure of the film while viewing the image on the back of the film carrier during aligning adjustments.

3. A camera as defined in claim 2, said means for adjusting said film carrier along coordinate axes and rotationally in the image plane.

4. A camera as defined in claim 3, said film carrier having guide lines on the back of it to facilitate proper image alignment on the film.

5. A film carrier for darkroom camera use having a transparent film carrier plate for receiving a multi-exposure film on its front face, and means for adjusting said plate to move said front face in the plane of the image in proper alignment for each exposure,
   said plate having a ring frame, a circular concentric member rotationally supporting said ring frame and having a worm and gear means for rotationally adjusting said film, a support frame for said circular concentric member having means for vertically adjusting said member and said film, and horizontal track and roller means for said support frame for horizontal adjustment of the film in the image plane,
   said plate being frosted on its front face and having a transparent guide line film on its rear face to facilitate viewing and alignment of the image on the film.

References Cited by the Examiner
UNITED STATES PATENTS 3,022,706    2/1962    Kargl _____ 88—24
3,207,030    9/1965    Polland _____ 88—24

NORTON ANSHER, *Primary Examiner.*

RICHARD A. WINTERCORN, *Assistant Examiner.*